United States Patent
Khare et al.

(10) Patent No.: US 12,513,523 B2
(45) Date of Patent: Dec. 30, 2025

(54) ROAMING IN CELLULAR COMMUNICATION NETWORKS

(71) Applicant: Nokia Technologies Oy, Espoo (FI)

(72) Inventors: Saurabh Khare, Bangalore (IN); Chaitanya Aggarwal, Munich (DE); Anja Jerichow, Munich (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 190 days.

(21) Appl. No.: 18/262,833

(22) PCT Filed: Feb. 15, 2022

(86) PCT No.: PCT/FI2022/050091
§ 371 (c)(1),
(2) Date: Jul. 25, 2023

(87) PCT Pub. No.: WO2022/175593
PCT Pub. Date: Aug. 25, 2022

(65) Prior Publication Data
US 2024/0089735 A1    Mar. 14, 2024

(30) Foreign Application Priority Data
Feb. 17, 2021    (FI) ...................................... 20215158

(51) Int. Cl.
*H04W 12/088*    (2021.01)
*H04L 9/40*    (2022.01)
(Continued)

(52) U.S. Cl.
CPC ....... *H04W 12/088* (2021.01); *H04L 63/0227* (2013.01); *H04W 12/02* (2013.01); *H04W 12/63* (2021.01)

(58) Field of Classification Search
CPC ......... H04W 12/02; H04W 12/08–088; H04W 12/60–69; H04L 63/0227
See application file for complete search history.

(56) References Cited

U.S. PATENT DOCUMENTS

2013/0324106 A1* 12/2013 Bodog .................. H04W 24/10
455/422.1
2014/0045493 A1* 2/2014 Hapsari ................. H04W 24/10
455/432.1
(Continued)

FOREIGN PATENT DOCUMENTS

EP    3503601 A1    6/2019
JP    2014-036422 A    2/2014
(Continued)

OTHER PUBLICATIONS

"3rd Generation Partnership Project; Technical Specification Group Services and System Aspects; Study on User Consent for 3GPP services (Release 17)", 3GPP TR 33.867, V0.1.0, Oct. 2020, pp. 1-11.
(Continued)

*Primary Examiner* — Madhuri R Herzog
(74) *Attorney, Agent, or Firm* — Carter, DeLuca & Farrell LLP

(57) ABSTRACT

According to an example aspect of the present invention, there is provided an apparatus comprising means for determining a data privacy filter of a user equipment, wherein the data privacy filter is configured to be used in a visited network by the user equipment to determine whether a request, from a network function in the visited network, to collect data from the user equipment is acceptable and whether the user equipment should transmit said data to the network function and means for transmitting, to the user equipment located in the visited network, the data privacy filter of the user equipment.

1 Claim, 6 Drawing Sheets

(51) Int. Cl.
*H04W 12/02* (2009.01)
*H04W 12/63* (2021.01)

(56) References Cited

U.S. PATENT DOCUMENTS

| | | | |
|---|---|---|---|
| 2014/0094159 | A1 | 4/2014 | Raleigh et al. |
| 2018/0173882 | A1 | 6/2018 | Hamilton et al. |
| 2019/0253894 | A1 | 8/2019 | Bykampadi et al. |
| 2019/0327363 | A1 | 10/2019 | Raleigh et al. |
| 2021/0185523 | A1* | 6/2021 | Targali ............... H04W 12/0471 |
| 2023/0345244 | A1* | 10/2023 | Kim ................. H04W 12/06 |

FOREIGN PATENT DOCUMENTS

| | | | | |
|---|---|---|---|---|
| WO | WO-2012019652 | A1 * | 2/2012 | ............ H04W 24/00 |
| WO | 2017/062601 | A1 | 4/2017 | |

OTHER PUBLICATIONS

"3rd Generation Partnership Project; Technical Specification Group Core Network and Terminals; 5G System; Unified Data Management Services; Stage 3 (Release 17)", 3GPP TS 29.503, V17.0.0, Sep. 2020, pp. 1-367.

"3rd Generation Partnership Project; Technical Specification Group Services and System Aspects; System architecture for the 5G System (5GS); Stage 2 (Release 16)", 3GPP TS 23.501, V16.6.0, Sep. 2020, pp. 1-447.

"3rd Generation Partnership Project; Technical Specification Group Services and System Aspects; Security architecture and procedures for 5G system (Release 16)", 3GPP TS 33.501, V16.5.0, Dec. 2020, pp. 1-253.

Office action received for corresponding Finnish Patent Application No. 20215158, dated Jul. 5, 2021, 11 pages.

"KI#15, conclusions: update to resolve ENs", SA WG2 Meeting #142E, S2-2009385, Agenda: 8.1, Nokia, Nov. 16-20, 2020, pp. 1-2.

Office action received for corresponding Finnish Patent Application No. 20215158, dated Jan. 20, 2022, 8 pages.

International Search Report and Written Opinion received for corresponding Patent Cooperation Treaty Application No. PCT/FI2022/050091, dated May 16, 2022, 28 pages.

"3rd Generation Partnership Project; Technical Specification Group Services and System Aspects; Study on enablers for network automation for the 5G System (5GS); Phase 2 (Release 17)", 3GPP TR 23.700-91, V17.0.0, Dec. 2020, pp. 1-382.

Extended European Search Report received for corresponding European Patent Application No. 22755630.5, dated Nov. 13, 2024, 12 pages.

"Logged MDT continuity across PLMNs", 3GPP TSG-RAN WG2 Meeting #77bis, R2-121122, Agenda: 5.2.3, Nokia Siemens Networks, Mar. 26-30, 2012, 4 pages.

"Update solution 6 of User Privacy Setting send via AMF", SA WG2 Meeting #127, S2-184046, Agenda: 6.13, CATT, Apr. 16-20, 2018, pp. 1-4.

* cited by examiner

510 Receiving, from a database configured to store subscription information of a UE in a home network of the UE, a data privacy filter of the UE, wherein the data privacy filter is to be used in a visited network by the UE to determine whether a request, from an NF in the visited network, to collect data from the UE is acceptable

520 Determining, responsive to receiving the request, whether to transmit said data to the NF based on the data privacy filter

FIGURE 5

ROAMING IN CELLULAR COMMUNICATION NETWORKS

RELATED APPLICATION

This application claims priority to PCT Patent Application No. PCT/FI2022/050091, filed Feb. 15, 2022, and FI application No. 20215158, filed Feb. 17, 2021, each of which is incorporated herein by reference in its entirety.

FIELD

Various embodiments relate in general to cellular communication networks and more specifically, to roaming in such networks.

BACKGROUND

Mobility of wireless terminals, such as User Equipment, UEs, needs to be enabled in various cellular communication networks. Roaming is related to mobility, as roaming refers to a wireless terminal which has moved from a coverage area of its home network to a coverage area of another, visited network. For instance, roaming should be enabled in cellular communication networks operating according to Long Term Evolution, LTE, and/or 5G radio access technology. 5G radio access technology may also be referred to as New Radio, NR, access technology. Since its inception, LTE has been widely deployed and 3rd Generation Partnership Project, 3GPP, still develops LTE. Similarly, 3GPP also develops standards for 5G/NR. In general, there is a need to provide improved methods, apparatuses and computer programs for roaming in cellular communication networks.

SUMMARY

According to some aspects, there is provided the subject-matter of the independent claims. Some embodiments are defined in the dependent claims.

The scope of protection sought for various embodiments of the invention is set out by the independent claims. The embodiments and features, if any, described in this specification that do not fall under the scope of the independent claims are to be interpreted as examples useful for understanding various embodiments of the invention.

According to an aspect of the present invention, there is provided an apparatus, comprising means for determining a data privacy filter of a user equipment, wherein the data privacy filter is configured to be used in a visited network by the user equipment to determine whether a request, from a network function in the visited network, to collect data from the user equipment is acceptable and whether the user equipment should transmit said data to the network function and means for transmitting, to the user equipment located in the visited network, the data privacy filter of the user equipment. The apparatus may comprise a database which stores subscription information of the user equipment in the home network of the user equipment, or a control device configured to control the functioning thereof, possibly when installed therein.

According to an aspect of the present invention, there is provided an apparatus, comprising means for receiving, from a database configured to store subscription information of a user equipment in a home network of the user equipment, a data privacy filter of the user equipment, wherein the data privacy filter is to be used in a visited network by the user equipment to determine whether a request, from a network function in the visited network, to collect data from the user equipment is acceptable and means for determining, responsive to receiving the request, whether to transmit said data to the network function based on the data privacy filter. The apparatus may comprise the roaming user equipment, or a control device configured to control the functioning thereof, possibly when installed therein.

According to an aspect of the present invention, there is provided an apparatus, comprising means for receiving, from a database configured to store subscription information of a user equipment in a home network of the user equipment, a data privacy filter of the user equipment, wherein the data privacy filter is configured to be used in a visited network by the user equipment to determine whether a request, from a network function in the visited network, to collect data from the user equipment is acceptable and whether the user equipment should transmit said data to the network function and means for transmitting the data privacy filter to the user equipment located in the visited network. The apparatus may comprise a management network function located in the visited network of the user equipment, or a control device configured to control the functioning thereof, possibly when installed therein.

According to an aspect of the present invention, there is provided a first method, comprising determining a data privacy filter of a user equipment, wherein the data privacy filter is configured to be used in a visited network by the user equipment to determine whether a request, from a network function in the visited network, to collect data from the user equipment is acceptable and whether the user equipment should transmit said data to the network function and transmitting, to the user equipment located in the visited network, the data privacy filter of the user equipment. The first method may be performed by a database which stores subscription information of the user equipment in the home network of the user equipment, or a control device configured to control the functioning thereof, possibly when installed therein.

According to an aspect of the present invention, there is provided a second method, comprising receiving, from a database configured to store subscription information of a user equipment in a home network of the user equipment, a data privacy filter of the user equipment, wherein the data privacy filter is to be used in a visited network by the user equipment to determine whether a request, from a network function in the visited network, to collect data from the user equipment is acceptable and determining, responsive to receiving the request, whether to transmit said data to the network function based on the data privacy filter. The second method may be performed by a roaming user equipment, or a control device configured to control the functioning thereof, possibly when installed therein.

According to an aspect of the present invention, there is provided a third method, comprising receiving, from a database configured to store subscription information of a user equipment in a home network of the user equipment, a data privacy filter of the user equipment, wherein the data privacy filter is configured to be used in a visited network by the user equipment to determine whether a request, from a network function in the visited network, to collect data from the user equipment is acceptable and whether the user equipment should transmit said data to the network function and transmitting the data privacy filter to the user equipment located in the visited network. The third method may be performed by a management network function located in the visited network of the user equipment, or a control device configured to control the functioning thereof, possibly when installed therein.

According to an aspect of the present invention, there is provided an apparatus comprising at least one processing core, at least one memory including computer program code, the at least one memory and the computer program code being configured to, with the at least one processing core, cause the apparatus at least to perform, determine a data privacy filter of a user equipment, wherein the data privacy filter is configured to be used in a visited network by the user equipment to determine whether a request, from a network function in the visited network, to collect data from the user equipment is acceptable and whether the user equipment should transmit said data to the network function and transmit, to the user equipment located in the visited network, the data privacy filter of the user equipment. The apparatus may comprise a database which stores subscription information of the user equipment in the home network of the user equipment, or a control device configured to control the functioning thereof, possibly when installed therein.

According to an aspect of the present invention, there is provided an apparatus comprising at least one processing core, at least one memory including computer program code, the at least one memory and the computer program code being configured to, with the at least one processing core, cause the apparatus at least to perform, receive, from a database configured to store subscription information of a user equipment in a home network of the user equipment, a data privacy filter of the user equipment, wherein the data privacy filter is to be used in a visited network by the user equipment to determine whether a request, from a network function in the visited network, to collect data from the user equipment is acceptable and determine, responsive to receiving the request, whether to transmit said data to the network function based on the data privacy filter. The apparatus may comprise the roaming user equipment, or a control device configured to control the functioning thereof, possibly when installed therein.

According to an aspect of the present invention, there is provided an apparatus comprising at least one processing core, at least one memory including computer program code, the at least one memory and the computer program code being configured to, with the at least one processing core, cause the apparatus at least to perform, receive, from a database configured to store subscription information of a user equipment in a home network of the user equipment, a data privacy filter of the user equipment, wherein the data privacy filter is configured to be used in a visited network by the user equipment to determine whether a request, from a network function in the visited network, to collect data from the user equipment is acceptable and whether the user equipment should transmit said data to the network function and transmit the data privacy filter to the user equipment located in the visited network. The apparatus may comprise a management network function located in the visited network of the user equipment, or a control device configured to control the functioning thereof, possibly when installed therein.

According to an aspect of the present invention, there is provided a non-transitory computer readable medium having stored thereon a set of computer readable instructions that, when executed by at least one processor, cause an apparatus to at least perform the first, second, or third method. According to an aspect of the present invention, there is provided a computer program comprising instructions which, when the program is executed by an apparatus, cause the apparatus to carry out the first, second or third method.

BRIEF DESCRIPTION OF THE DRAWINGS

FIG. 5 illustrates a flow graph of a second method in accordance with at least some embodiments.

EMBODIMENTS

Roaming may be improved in cellular communication networks by the procedures described herein. More specifically, a data privacy filter may be used by a User Equipment, UE, in a visited network to determine whether a request to collect data from the UE is acceptable and whether the UE should transmit said data to a Network Function, NF, which requested said data. The UE may therefore control whether to respond to the request to collect said data from the UE, thereby enabling enforcement of user consent and/or operator policies when the UE is roaming in the visited network. The purpose of the data privacy filter is to ensure that privacy of the UE, and the user of the UE, is respected and secured. The data privacy filter may be referred to as a data generation filter as well, as the filter may refer to data generated by UE. For example, the UE may collect environment data, such as temperature of the environment, and that temperature may be called said data. Therefore, said data may be in general any data related to the UE, such as data generated by the UE.

Figure 1:
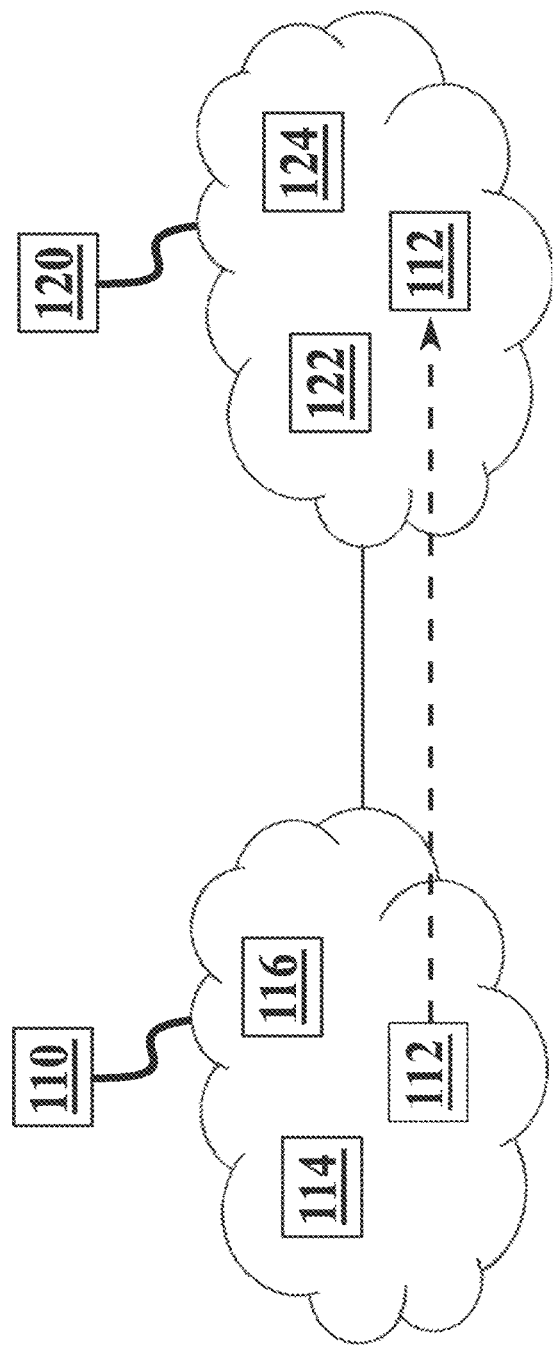
FIG. 1 illustrates an example of a communication system in accordance with at least some embodiments.

FIG. 1 illustrates an example of a communication system in accordance with at least some embodiments. In FIG. 1, two networks, such as Public Land Mobile Networks, PLMNs, are shown. A home network, i.e., HPLMN, of UE 112 is denoted by 110 and a visited network, i.e., VPLMN, of UE 112 is denoted by 120. Home network 110 is a network wherein a subscription profile of UE 112 is held. The subscription profile of UE 112 may comprise, for example, user consent information of UE 112 and other information related to UE 112. Home network 110 may be provided by one operator and visited network 120 may be provided by another operator, so that UE 112 may continue using communication services after moving from a coverage area of home network 110 to a coverage area of visited network 120.

UE 112 may comprise, for example, a smartphone, a cellular phone, a Machine-to-Machine, M2M, node, Machine-Type Communications node, MTC, an Internet of Things, IoT, node, a car telemetry unit, a laptop computer, a tablet computer or, indeed, any kind of suitable mobile wireless terminal or station. UE 112 may have a wireless connection to a base station of home network 110 before roaming and the base station of home network 110 may be further connected to home network 110 via a wired connection. Similarly, UE 112 may have a wireless connection to a base station of visited network 120 when UE 112 is roaming in visited network 120 and the base station of visited network 120 may be further connected to visited network 120 via a wired connection. Home network 110 and visited network 120 may be referred to as core networks, such as core networks operating in accordance with at least some standards defined by the $3^{rd}$ Generation Partnership Project, 3GPP, like 5G standards, for example. Hence, apparatuses in home network 110 and visited network 120 112 may be configured to operate according to the 3GPP standards. Wireless connections of UE 112 may be performed using a radio access technology defined by the 3GPP standards and UE 112 may be configured to operate according to the 3GPP standards as well.

Each of networks 110, 120 may be equipped with at least one NF. An NF may refer to an operational and/or a physical entity. An NF may be a specific network node or element, or a specific function or set of functions carried out by one or more entities, such as Virtual Network Elements, VNFs. One physical node may be configured to perform plural NFs. Examples of such network functions include a (radio) access or resource control or management function, session management or control function, interworking, data management or storage function, authentication function or a combination of one or more of these functions.

In case of a 3GPP Service-Based Architecture, SBA, of 5G core networks, NFs may comprise at least some of an Access and Mobility Function, AMF, a Session Management Function, SMF, a Unified Data Manager, UDM, a Unified Data Repository, UDR, an Authentication Server Function, AUSF and an Application Function, AF. In some embodiments, the AF may not be a NF though as defined by the 3GPP. Instead, the AF may be a complement to the NF. The AF may be a third party AF, e.g., for an enterprise, possibly outside the 3GPP network.

In FIG. 1, a database which stores subscription information of UE 112, such as a UDM or a UDR, in home network 110 is denoted by 114 while an authentication NF, such as an AUSF, in home network 110 is denoted by 116. Moreover, a management NF, such as an AMF or a SMF, in visited network 110 is denoted by 122. An NF or an AF, located in visited network 120, which would like to collect data from UE 112 is denoted by 124. NFs 114, 116, 122 and 124 may be connected to each other and communicate via wired connection(s).

Privacy regulations may define that said data of UE 112 must not be collected without consent of the user of UE 112. Consent of the user of UE 112 may be indicated in the form of user consent information, which may comprise at least one Boolean flag (true/false) indicating whether access to said data of UE 112 is acceptable, i.e., whether the user of UE 112 allows that said data can be collected from UE 112 or not.

Said data to be collected from UE 112 may comprise, for example, a radio coverage report, environment related report and/or data use report of UE 112. Said user consent information may be stored in database 114 in home network 110, e.g., in a form of a UDM subscriber profile. Said user consent information should be respected. If said user consent information indicates that said data should not be collected from UE 112, an NF should not collect said data from UE 112 for any purpose. Based on an operator policy, said user consent information can be enforced in all NFs in home network 110 of UE 112, i.e., in the same PLMN. Said user consent information may be set by a contract between the user of UE 112 and the operator of home network 110, and then enforced by the operator within its network. Also, policies of operators of home network 110 and/or visited network 120 may need to be taken into account.

UE 112, and the user of UE 112, should be protected when UE 112 is roaming in visited network 120 as well. AF/NF 124 may get user consent information of UE 112 from database 114 but it should be ensured that AF/NF 124 cannot collect said data from UE 112 when UE 112 is roaming in visited network 120, i.e., it should be ensured that AF/NF 124 cannot disregard said user consent information. In other words, it should be ensured that said user consent information is applied correctly by partner NFs in visited network 120 when UE 112 is roaming therein.

As an example, the user of UE 112 may be a subscriber of a first operator. Hence, the user of UE 112 may set his user consent information as NO, concerning a specific type of UE 112 related information, when signing a contract with the first operator, or later on. In any case, said data should not be collected from UE 112 for any reason after the user of UE 112 has set his user consent information as NO. NFs of the first operator may respect said user consent information and not collect said data from UE 112.

However, when UE 112 moves to visited network 120, e.g., to a different country (VPLMN), and is connected to AF/NF 124 for example, AF/NF 124 may not respect said user consent information and try to collect said data from UE 112. For instance, a Network Data Analytics Function, NWDAF, or an AF located in visited network 120 may trigger SMF (user plane) and/or User Plane Function, UPF, (user plane) to collect reports about UE 112, create a user plane/control plane signaling procedure with UE 112 and start collecting said data from UE 112. If UE 112 does not have any instruction from home network 110, UE 112 would generate data whenever there is a request from any NF/AF. Hence operator enforcement of data collection behaviour by NFs would be limited to operator's own network and not possible in visited network 120. It should be ensured that said user consent information can be enforced in visited network 120 as well.

A data privacy filter is therefore provided for UE 112. The data privacy filter is to be used in visited network 120 by UE 112 to determine whether a request to collect said data from UE 112, e.g., from AF/NF 124 in visited network 120, is acceptable. The data privacy filter of UE 112 may be determined by database 114 individually for each visited network 120. The data privacy filter of UE 112 may be transmitted from database 114 to UE 112 when UE 112 is roaming in visited network 120, for example in an encrypted message, such as Non-Access Stratum, NAS, signalling. Transmission of the data privacy filter to UE 112 makes it possible for UE 112 to control whether to respond to the request to collect said data from UE 112, thereby enabling enforcement of user consent and/or operator policies when UE 112 is roaming in visited network 120.

Figure 2:
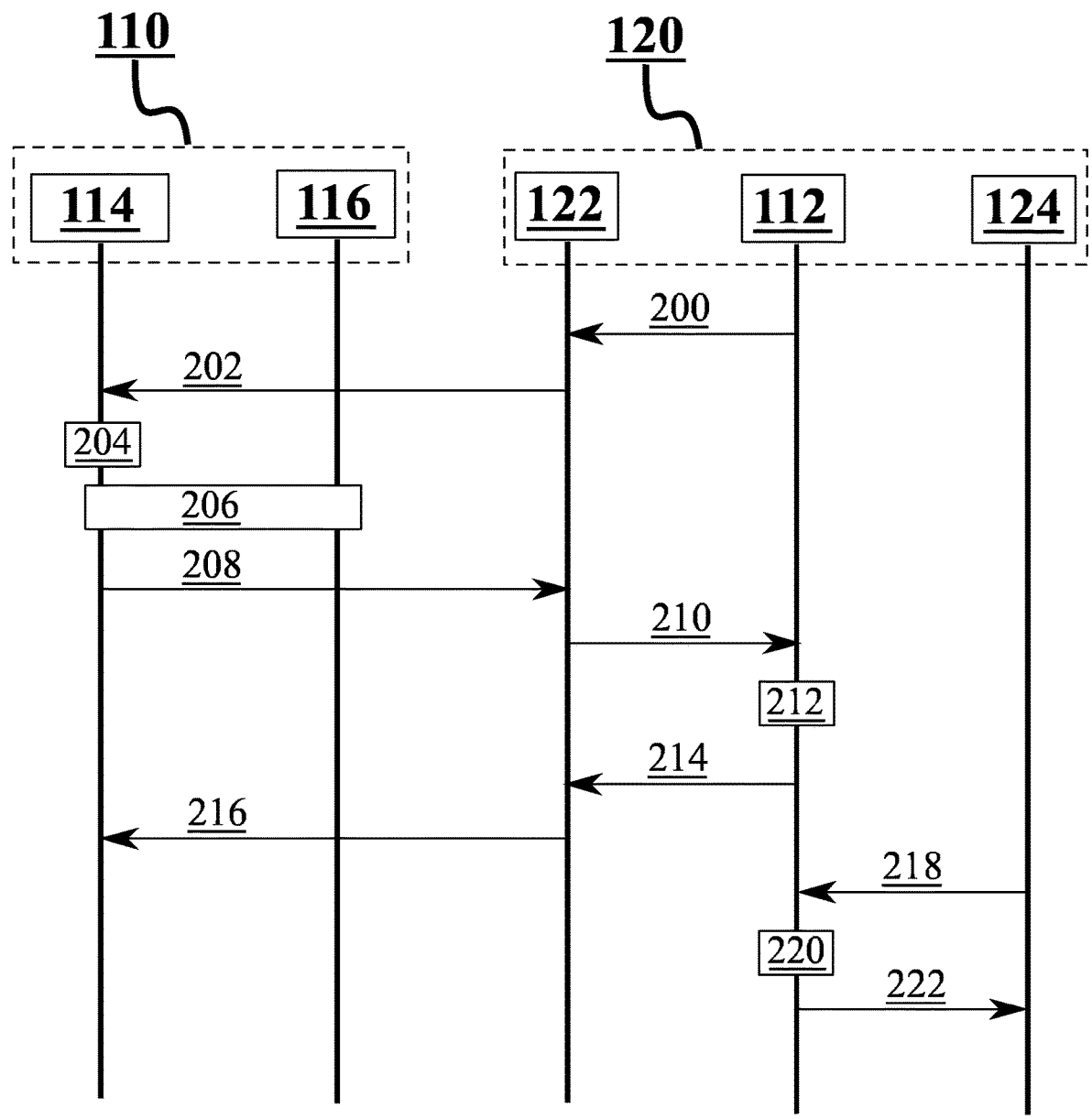
FIG. 2 illustrates a signalling graph in accordance with at least some embodiments.

FIG. 2 illustrates a signalling graph in accordance with at least some embodiments. With reference to FIG. 1, on the vertical axes are disposed, from the left to the right, database 114 and authentication NF 116 of home network 110 along with management NF 122, UE 112 and AF/NF 124 of visited network 120. Time advances from the top towards the bottom.

At step 200, UE 112 may register with management NF 122, for example AMF, in visited network 120 after UE 112 has moved to a coverage area of visited network 120. When UE 112 registers in visited network 120, management NF 122 may transmit, at step 202, a registration request related to UE 112 to database 114 in home network 110 of UE 112. The registration request related to UE 112 may be transmitted by management NF 122 to ask subscription data of UE 112. The registration request related to UE 112 may comprise a flag, or an indication, indicating that UE 112 supports data privacy related filtering, for example if UE 112 has provided such flag/indication to management NF 122.

Responsive to receiving the registration request, database 114 may determine the data privacy filter of UE 112 at step 204. Database 114 may determine the data privacy filter of UE 112 individually for each visited network requesting registration, i.e., per PLMN, for example. Thus, the data privacy filter of UE 112, determined at step 204, may be specific for visited network 120. In some embodiments, if the registration request comprises the flag, or the indication, indicating that UE 112 supports data privacy filtering, database 114 may check the flag/indication before determining the data privacy filter. Database 114 may determine the data privacy filter only when the flag/indication indicates that UE 112 supports data privacy filtering, thereby enabling efficient operation when UE 112 is roaming.

The data privacy filter may be determined by database 114 using user consent information of UE 112. For example, the user of UE 112 may have defined that no NF in visited network 120 is allowed to access said data of UE 112. In such a case, the data privacy filter may indicate to UE 112 that all requests to collect said data from UE 112, received from NFs in visited network 112, need to be refused and no data should be provided by UE 112 to such NFs. As a further example, the user of UE 112 may have defined that no NF in any visited network is allowed to access said data of UE 112. In some embodiments, UE 112 may not generate data for any PLMN or NF.

Alternatively, or in addition, the data privacy filter may be determined by database 114 using a policy of an operator of home network 110. For example, the policy of the operator of home network 110 may define that no NF in visited network 120 is allowed to access said data of UE 112 if there is no contract between home network 110 and visited network 120, or visited network 120 has not obeyed the contract. In some embodiments, the policy of the operator of home network 110 may define that no NF in visited network 120 is allowed to access said data of UE 112 if technical capabilities, such as security capabilities of visited network 120, are not good enough, because in such a case said data of UE 112 may be vulnerable to attacks if distributed in visited network 120. The policy of the operator of home network 110 may thus comprise, or at least be related to, technical capabilities of visited network 120.

Alternatively, or in addition, the data privacy filter may be determined by database 114 using a policy of an operator of visited network 120. For example, the policy of the operator of visited network 120 may define that said data of UE 112 may be further distributed to third parties by visited network 120 and in such a case home network 120 may determine that no NF in visited network 120 is allowed to access said data of UE 112, to ensure privacy of said data. The policy of the operator of visited network 110 may thus comprise, or at least be related to, agreements of visited network 120 with third parties.

The use of the combination of said user consent information of UE 112, the policy of the operator of home network 110 and the policy of the operator of visited network 120 provides synergistic benefits, because privacy of said data of UE 112 can be protected optimally. For example, even if the user of UE 112 would have defined that all NFs in visited network 120 are allowed to access said data of UE 112 and the technical capabilities of visited network 120 would be good enough, the request may still be rejected if visited network 120 has an improper agreement with a third party. Even if the user of UE 112 would have defined that all NFs in visited network 120 are allowed to access said data of UE 112 and visited network 120 would not have the improper agreement with a third party, the request may still be rejected if the technical capabilities of visited network 120 are not good enough.

The data privacy filter may comprise one or more subfilters. For instance, the data privacy filter may indicate whether retrieval of user plane data of UE 112 and/or control plane data of UE 112 is allowed for certain, or all, NFs in visited network 120 or any NF in any network. Alternatively, or in addition, the data privacy filter may indicate whether retrieval of sensor based data of UE 112 is allowed for certain, or all, NFs, in visited network 120. For instance, if UE 112 is an IOT device, the behaviour of what sensor should work when roaming, or not, may be defined.

| PLMN ID | DataPrivacyFilterForPLMN |
|---|---|
| IDi | [User plane data retrieval (True/False), Control plane data retrieval (True/False), UE sensor based data retrieval (True/False), . . .] |
| . . . | . . . |

At step 206, an encrypted and/or integrity protected message comprising the data privacy filter may be generated. As the message is generated in home network 110 by database 114 and authentication function 116, it may be ensured that management NF 122 in visited network 120 cannot change or read the data privacy filter of UE 112. The encrypted message may be generated using the procedure for UE Parameters Update, UPU, as described in Section 6.15.2 of the 3GPP standard specification TS 33.501 (V16.5.0) for example. In some embodiments, visited network 120 may be allowed to change the data privacy filter though, e.g., if visited network 120 has a stronger privacy regulation than home network 110. In such a case, a key for the encrypted and/or integrity protected message may be transmitted from home network 110 to visited network 120, to enable better service when UE 112 is roaming.

At step 208, database 114 may transmit the data privacy filter of UE 112 to UE 112, possibly in the encrypted and/or integrity protected message. The data privacy filter may be transmitted to UE 112 via management NF 122 in visited network 120, for example. That is, at step 208, database 114 may transmit the data privacy filter of UE 112 to management NF 122 in a registration response and, at step 210, management NF 122 may forward the data privacy filter to UE 112 in a registration accept message. The registration response and accept messages are transmitted over NAS signalling for example with UPU data, UPU-MAC-Iausf, Counter-upu.

At step 212, UE 112 may verify the data privacy filter and store the received data privacy filter, for example in a memory internal to UE 112. At step 214, UE 112 may transmit an acknowledgement about reception of the data privacy filter to UE 112. At step 216, management NF 122 may transmit an acknowledgement to database 114, to acknowledge that the data privacy filter of UE 112 has been transmitted to UE 112.

As UE 112 has successfully received the data privacy filter from home network 110 (database 114), UE 112 may decide if said data of UE 112 needs to be generated for different use cases, such as user plane, control plane and/or sensor based data. If the data privacy filter is provided to UE 112 via secure way in a message, such as a UPU procedure, it is ensured that NFs in visited network 120 cannot read or change the data privacy filter. As the data privacy filter may be encrypted by for example an UDM and/or an AUSF, NFs in visited network 120 cannot read it, and only UE 112 can decrypt the message and respect the filter.

Upon reception of the data privacy filter, UE 112 may decide for requests coming from NFs in visited network 120 whether data needs to be generated or not. Any AF/NF 124 (including management NF 122) in visited network 120 may request, at step 218, collection of said data of UE 112 over the user plane and/or the control plane. UE 112 may determine, at step 220, whether to transmit said data to AF/NF 124 based on the data privacy filter. For instance, if the data privacy filter would indicate that collection of user plane data and/or control plane data of UE 112 is not acceptable in visited network 120, UE 112 may reject the request at step 222. Similarly, if the data privacy filter would indicate that collection of user plane data and/or control plane data of UE 112 is allowed by AF/NF 124 requesting said data, or any NF in visited network 120 requesting said data in general, UE 112 may accept the request and provide the requested data at step 222.

That is to say, UE 112 may transmit said data to AF/NF 124 when the data privacy filter indicates that AF/NF 124 in visited network 120 is allowed to collect said data or that UE 112 is to provide said data in visited network 120 irrespective of which NF in visited network 120 is requesting said data. Sometimes UE 112 may know an identity of AF/NF 124 but sometimes not. Hence, giving an instruction to UE 112 in a generic way is also enabled.

The data privacy filter may be tightly coupled with user consent information of UE 112, e.g., based on an input of the user of UE 112. Alternatively, or in addition, the data privacy filter may be tightly coupled with capabilities of visited network 120 and agreements between an operator of home network 110 and an operator of visited network 120, so the operator of home network 110 may populate the data privacy filter of UE 112 for visited network 120. That is, the data privacy filter may be based on the policy of the operator of home network 110 of UE 112, the policy of the operator of visited network 120 and/or said user consent information of UE 112. In some embodiments, when the data privacy filter of UE 112 is modified, database 114 may transmit the modified data privacy filter to management NF 122 and management NF 122 may forward it to UE 112. Thus, the data privacy filter of UE 112 may be changed.

It is noted that management NF 122 may anyway neglect the data privacy filter and collect some data from NFs in visited network 120. For instance, information about mobility events collected by an AMF would be available at the AMF so such network-level information may be used by NFs in visited network 120. However, embodiments of the present invention may be used for solving issues related to data collection from UE 112 in visited network 120. The advantage is that UE 112 may always receive up-to-date information (the data privacy filter) about how to react to data collection requests in visited network 120, thereby providing flexibility on the operator side, in case roaming agreements between PLMNs change for example.

Figure 3:
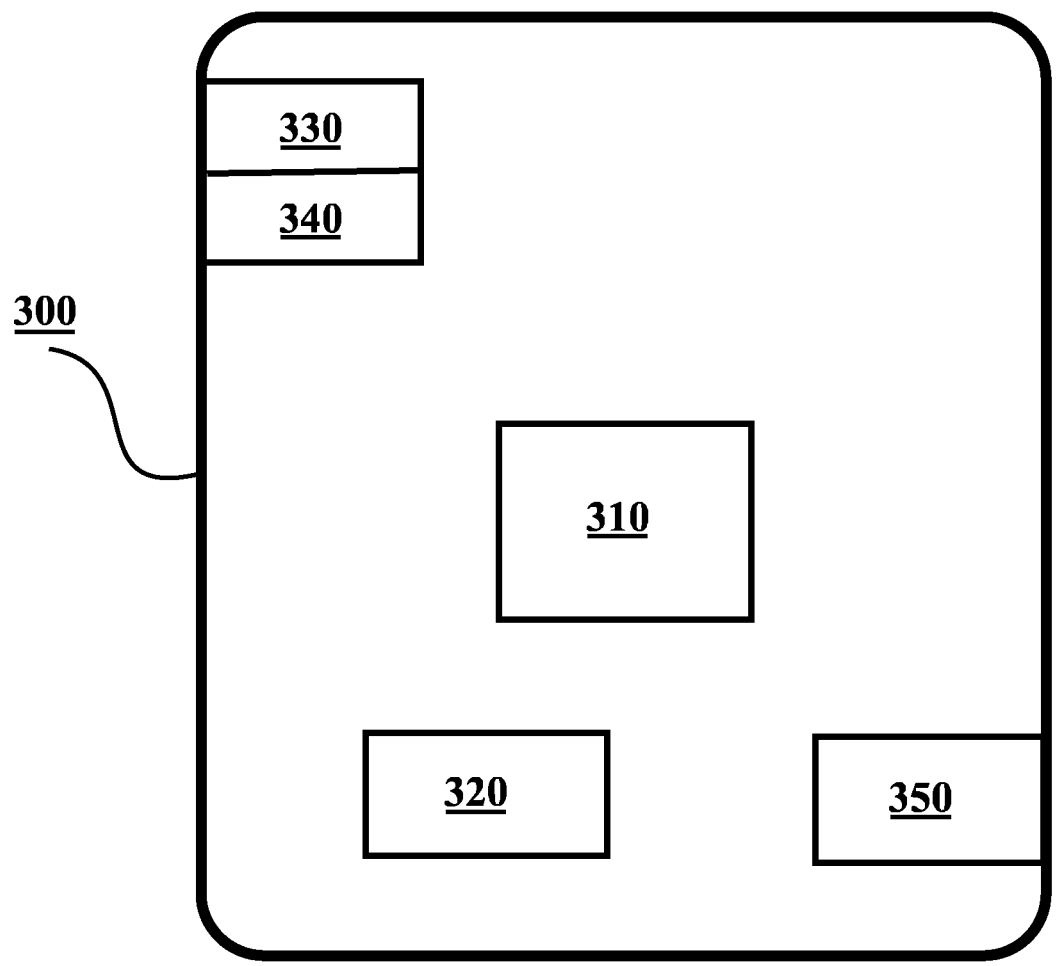
FIG. 3 illustrates an example apparatus capable of supporting at least some embodiments.

FIG. 3 illustrates an example apparatus capable of supporting at least some embodiments. Illustrated is device 300, which may comprise, for example, UE 112, database 114 or management NF 122, or a device controlling functioning thereof, possibly when installed therein. Comprised in device 300 is processor 310, which may comprise, for example, a single- or multi-core processor wherein a single-core processor comprises one processing core and a multi-core processor comprises more than one processing core.

Processor 310 may comprise, in general, a control device. Processor 310 may comprise more than one processor. Processor 310 may be a control device. Processor 310 may comprise at least one Application-Specific Integrated Circuit, ASIC. Processor 310 may comprise at least one Field-Programmable Gate Array, FPGA. Processor 310 may comprise an Intel Xeon processor for example. Processor 310 may be means for performing method steps in device 300, such as determining, causing transmitting and causing receiving. Processor 310 may be configured, at least in part by computer instructions, to perform actions. For instance, processor 310 may be configured to determine the data privacy filter of UE 112.

A processor may comprise circuitry, or be constituted as circuitry or circuitries, the circuitry or circuitries being configured to perform phases of methods in accordance with embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a network function, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular standard, such as a standard defined by the 3GPP. Transmitter 330 may comprise more than one transmitter. Receiver 340 may comprise more than one receiver. Transmitter 330 and/or receiver 340 may be configured to operate in accordance with a suitable communication standard.

For instance, transmitter 330 may be configured to transmit the success response or perform any other transmitting step. Similarly, receiver 340 may be configured for example to receive the user consent authorization request or perform any other receiving step. Transmitter 330 and receiver 340 may be configured together to retrieve said user consent information or perform any other retrieving step.

Device 300 may comprise User Interface, UI, 350. UI 350 may comprise at least one of a display, a keyboard, a touchscreen, a vibrator arranged to signal to a user by causing device 300 to vibrate, a speaker or a microphone. A user may be able to operate device 300 via UI 350, for example to configure device 300 and/or functions it runs.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. In some embodiments, device 300 lacks at least one device described above. For example, device 300 may not have UI 350.

Processor 310, memory 320, transmitter 330, receiver 340 and/or UI 350 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
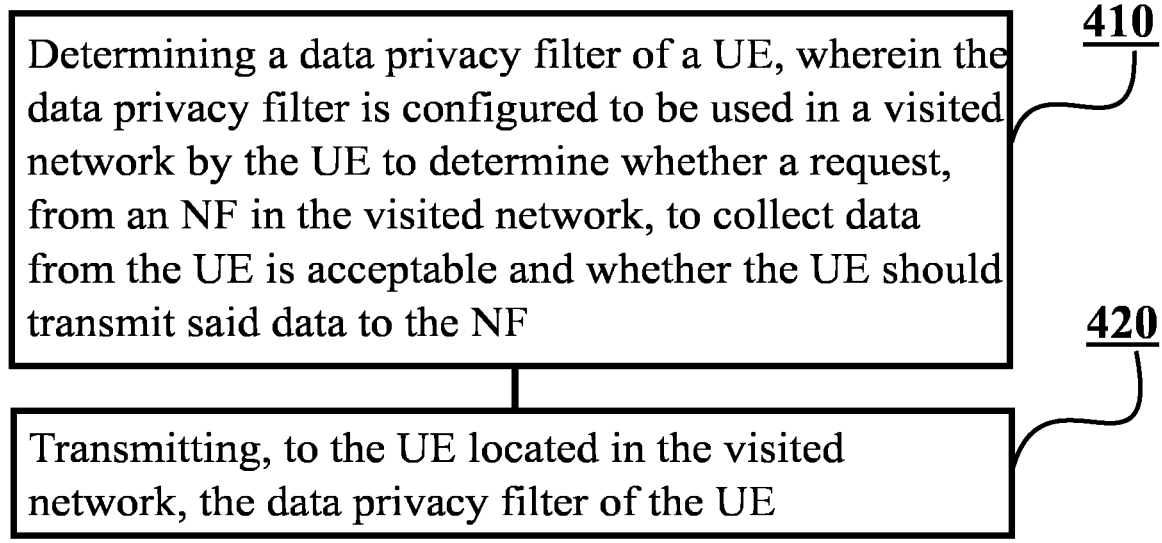
FIG. 4 illustrates a flow graph of a first method in accordance with at least some embodiments.

FIG. 4 is a flow graph of a first method in accordance with at least some embodiments. The phases of the illustrated first method may be performed by database 114 or a device controlling functioning thereof, possibly when installed therein.

The first method may comprise, at step 410, determining a data privacy filter of a user equipment, wherein the data privacy filter is configured to be used in a visited network by the user equipment to determine whether a request, from a network function in the visited network, to collect data from the user equipment is acceptable and whether the user equipment should transmit said data to the network function. The first method may also comprise, at step 420, transmitting, to the user equipment located in the visited network, the data privacy filter of the user equipment.

FIG. 5 is a flow graph of a second method in accordance with at least some embodiments. The phases of the illustrated second method may be performed by UE 112 or a device controlling functioning thereof, possibly when installed therein.

The second method may comprise, at step 510, receiving, from a database configured to store subscription information of a user equipment in a home network of the user equipment, a data privacy filter of the user equipment, wherein the data privacy filter is to be used in a visited network by the user equipment to determine whether a request, from a network function in the visited network, to collect data from the user equipment is acceptable. The second method may also comprise, at step 520, determining, responsive to receiving the request, whether to transmit said data to the network function based on the data privacy filter.

Figure 6:
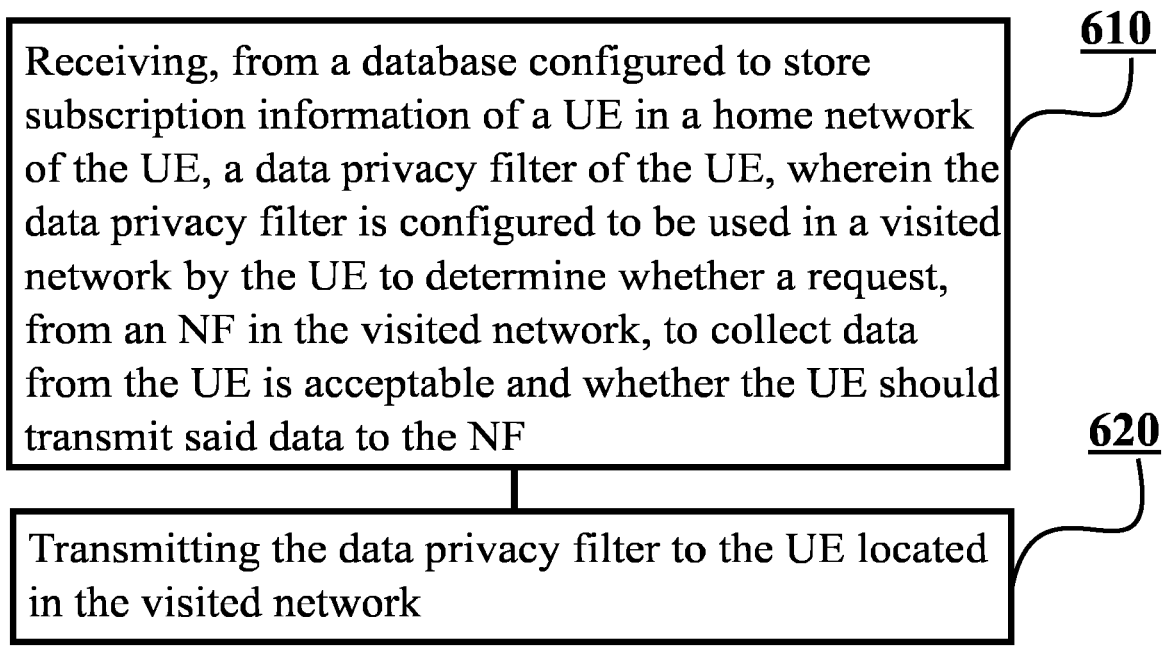
FIG. 6 illustrates a flow graph of a third method in accordance with at least some embodiments.

FIG. 6 is a flow graph of a third method in accordance with at least some embodiments. The phases of the illustrated third method may be performed by management NF 122 or a device controlling functioning thereof, possibly when installed therein.

The third method may comprise, at step 610, receiving, from a database configured to store subscription information of a user equipment in a home network of the user equipment, a data privacy filter of the user equipment, wherein the data privacy filter is configured to be used in a visited network by the user equipment to determine whether a request, from a network function in the visited network, to collect data from the user equipment is acceptable and whether the user equipment should transmit said data to the network function. The third method may also comprise, at step 620, transmitting the data privacy filter to the user equipment located in the visited network.

It is to be understood that the embodiments disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and examples may be referred to herein along with alternatives for the various components thereof. It is understood that such embodiments, examples, and alternatives are not to be construed as de facto equivalents of one another, but are to be considered as separate and autonomous representations.

In an embodiment, an apparatus, comprising for example UE 112, database 114 or management NF 122, may further comprise means for carrying out the embodiments described above and any combination thereof. The apparatus may be an apparatus of a cellular communication network, such as a 5G network, and comprise means for operating in the cellular communication network.

In an embodiment, a computer program comprising instructions which, when the program is executed by a computer, cause the computer to carry out a method in accordance with the embodiments described above and any combination thereof. In an exemplary embodiment, a computer program product, embodied on a non-transitory computer readable medium, may be configured to control a processor to perform a process comprising the embodiments described above and any combination thereof.

In an embodiment, an apparatus, comprising for example UE 112, database 114 or management NF 122, may further comprise at least one processor, and at least one memory including computer program code, wherein the at least one memory and the computer program code are configured to, with the at least one processor, cause the apparatus at least to perform the embodiments described above and any combination thereof. The apparatus may be an apparatus of a cellular communication network, such as a 5G network, and configured to operate in the cellular communication network.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention may be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the embodiments in one or more particular applications, it will be apparent to those of ordinary skill in the art that numerous modifications in form, usage and details of implementation may be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

The expression "at least one of A or B" in this document means A, or B, or both A and B.

INDUSTRIAL APPLICABILITY

At least some embodiments find industrial application in cellular communication networks, such as 5G networks, and possibly in other cellular communication networks in the future as well.

ACRONYMS LIST

3GPP 3$^{rd}$ Generation Partnership Project
AF Application Function
AMF Access and Mobility management Function
API Application Programming Interface
AUSF Authentication Server Function
NAS Non-Access Stratum
NF Network Function
NRF Network Repository Function
NWDAF Network Data Analytics Function
PLMN Public Land Mobile Networks
SBA Service-Based Architecture
SMF Session Management Function
UDM Unified Data Manager
UDR Unified Data Repository
UE User Equipment
UPF User Plane Function
UPU UE Parameters Update
VNF Virtual Network Function

REFERENCE SIGNS LIST

| | |
|---|---|
| 110 | Home network (HPLMN) |
| 112 | UE |
| 114 | Database |
| 116 | Authentication NF |
| 120 | Visited network (VPLMN) |
| 122 | Management NF |
| 124 | AF/NF |
| 200-222 | Steps in FIG. 2 |
| 300-350 | Structure of the apparatus of FIG. 3 |
| 410-420 | Phases of the method in FIG. 4 |
| 510-520 | Phases of the method in FIG. 5 |
| 610-620 | Phases of the method in FIG. 6 |

The invention claimed is:

1. An apparatus comprising at least one processor; and at least one memory storing instructions that, when executed by the at least one processor, cause the apparatus at least to perform:
   receiving, from a database configured to store subscription information of a user equipment in a home network of the user equipment, a data privacy filter of the user equipment, wherein the data privacy filter is to be used in a visited network by the user equipment to determine whether a request, from a network function in the visited network, to collect data from the user equipment is acceptable, wherein the data privacy filter of the user equipment is received from the database via a management network function located in the visited network, wherein the data privacy filter comprises at least a first indication about whether the network function in the visited network is allowed to collect said data from the user equipment, wherein the data privacy filter is received in an encrypted and integrity protected message, wherein the data privacy filter is based on user consent information, a policy of an operator of the home network, and a policy of an operator of the visited network;
   determining, responsive to receiving the request, whether to transmit said data to the network function based on the data privacy filter;
   transmitting said data to the network function when the data privacy filter indicates that the network function in the visited network is allowed to collect said data or that the apparatus is to provide said data in the visited network irrespective of which network function is requesting said data; and
   transmitting to the database a second indication indicating that the user equipment supports data privacy filtering.

* * * * *